(12) United States Patent
Zhao et al.

(10) Patent No.: US 11,496,357 B2
(45) Date of Patent: Nov. 8, 2022

(54) METHOD FOR CREATING RESOURCES AND CORRESPONDING REGISTRATION METHOD, SERVER, AND CLIENT DEVICE

(71) Applicant: BOE TECHNOLOGY GROUP CO., LTD., Beijing (CN)

(72) Inventors: Junjie Zhao, Beijing (CN); Zhiqiang Qiang, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 20 days.

(21) Appl. No.: 16/633,493

(22) PCT Filed: Feb. 8, 2018

(86) PCT No.: PCT/CN2018/075784
§ 371 (c)(1),
(2) Date: Jan. 23, 2020

(87) PCT Pub. No.: WO2019/019609
PCT Pub. Date: Jan. 31, 2019

(65) Prior Publication Data
US 2021/0135933 A1    May 6, 2021

(30) Foreign Application Priority Data
Jul. 28, 2017   (CN) .......................... 201710632554.7

(51) Int. Cl.
*H04L 12/24*     (2006.01)
*H04L 41/0806*   (2022.01)
(Continued)

(52) U.S. Cl.
CPC .......... *H04L 41/0806* (2013.01); *H04L 41/04* (2013.01); *H04L 41/082* (2013.01); *G16Y 30/00* (2020.01)

(58) Field of Classification Search
CPC ... H04L 41/0806; H04L 41/04; H04L 41/082; H04L 41/5003; G16Y 30/00; H04W 4/02; G06F 21/121; G06F 21/105
(Continued)

(56) References Cited

U.S. PATENT DOCUMENTS 8,677,318 B2 *  3/2014  Mohindra ............. G06F 9/5055
                                                      717/121
2014/0126581 A1 *  5/2014  Wang ...................... H04W 4/50
                                                      370/431
(Continued)

FOREIGN PATENT DOCUMENTS

CN       104811922 A       7/2015
WO   WO-2014088340 A1 *   6/2014  ............ H04W 12/06
WO   WO-2018232253 A1 *  12/2018

OTHER PUBLICATIONS

European Telecommunications Standards Institute (ETSI), Machine-to-Machine communications (M2M); Functional architecture, Oct. 2013, pp. 66-72, Retrieved via URL: https://www.etsi.org/deliver/etsi_ts/102600_102699/102690/02.01.01 _60/ts_102690v020101p.pdf (Year: 2013).*

(Continued)

*Primary Examiner* — Schquita D Goodwin (57) ABSTRACT

A method for creating resources and a corresponding registration method, server, client device, and computer readable storage medium. The method for creating resources includes: receiving a registration request; determining a registration type corresponding to the registration request; creating a resource corresponding to the registration type on the basis of the registration type.

15 Claims, 8 Drawing Sheets

(51) Int. Cl.
  *H04L 41/04*   (2022.01)
  *H04L 41/082*  (2022.01)
  *G16Y 30/00*     (2020.01)

(58) Field of Classification Search
  USPC .......................................................... 709/221
  See application file for complete search history.

(56) References Cited

U.S. PATENT DOCUMENTS

| | | | |
|---|---|---|---|
| 2014/0351312 A1 | 11/2014 | Lu et al. | |
| 2015/0358874 A1* | 12/2015 | Ahn ....................... | H04W 48/16 370/331 |
| 2016/0094485 A1* | 3/2016 | Choi ...................... | H04L 47/827 709/226 |
| 2016/0162666 A1* | 6/2016 | Casey ..................... | H04L 67/10 726/29 |
| 2016/0191295 A1* | 6/2016 | Dong ...................... | G06F 16/95 707/741 |
| 2016/0219125 A1* | 7/2016 | Xiao ....................... | H04L 67/26 |
| 2016/0277391 A1* | 9/2016 | Choyi .................... | H04L 63/062 |
| 2016/0345283 A1* | 11/2016 | Hong ..................... | H04W 60/00 |
| 2017/0201569 A1* | 7/2017 | Fu ......................... | G06F 9/45558 |
| 2017/0215023 A1* | 7/2017 | Ly ........................ | H04W 60/005 |
| 2017/0215026 A1 | 7/2017 | Kim et al. | |
| 2017/0279688 A1* | 9/2017 | Shao ...................... | H04L 67/12 |
| 2017/0337088 A1* | 11/2017 | Wang ..................... | G06F 9/541 |
| 2018/0083835 A1* | 3/2018 | Cole ...................... | H04L 41/12 |
| 2019/0182098 A1* | 6/2019 | Ly ........................ | H04L 41/0213 |
| 2020/0228948 A1* | 7/2020 | Watfa .................... | H04W 48/14 |

OTHER PUBLICATIONS

Henry Biesiada, Towards Standardized Portfolios: End-to-End Challenges in Modern IT Production—From the Portfolio to the Production Process, 2014, pp. 123-128, Retrieved via URL: https://link.springer.com/chapter/10.1007/978-3-642-40219-7_16 (Year: 2014).*

International Serach Report dated May 2, 2018; Application No. PCT/CN2018/075784.

* cited by examiner

METHOD FOR CREATING RESOURCES AND CORRESPONDING REGISTRATION METHOD, SERVER, AND CLIENT DEVICE

TECHNICAL FIELD

The present disclosure relates to the field of communications, and more particularly, to a method for creating resources, a corresponding registration method, a server device, and a client device.

BACKGROUND

IoT (Internet of Things) technology used to realize informatization, remote management control, and network intelligence gradually grows up, along with the development of information technology, especially Internet technology. IoT connects sensors, controllers, machines, humans, and things together in new ways by using a local area network or Internet or other communication technology to form association between humans and things, and association between things and things. IoT is an extension of Internet, encompasses Internet and all the resources on Internet, and offers compatibility to all applications on Internet. With the development of the IoT technology, various application fields where IoT is applied have developed rapidly.

With the development of mobile Internet, "Terminal+Platform+Client" is a universal solution. With the gradual promotion of standard platforms, platforms with overlapping functions will be gradually integrated in the future, and users do not have to switch between multiple platforms in order to manage multiple terminals. In addition, as for the applications of the users, some application platforms have protected content, the protected content can be obtained after the user terminal accesses the application platforms, for example, receiving audio and video files, posting blogs and other application-related services; meanwhile the user terminal also needs to access the management platform so that unified management can be performed, for example, a management project such as firmware update and software upgrade is performed on the user terminal.

For the users, on the one hand, it is desirable to be able to easily access the unified management platform so as to receive the universal management service, and on the other hand, it may not be desirable to leak information about the protected application service to the management platform. At present, no solution has been proposed to meet such needs of the users.

SUMMARY

Embodiments of the present disclosure provide a method for creating resources and a corresponding method for registration, different platform functions can be obtained for a same device by means of registering on different platforms, thus achieving cooperation management of different platforms for the same device, avoiding inconvenience of use caused by the isolation of multiple device platforms, and improving the level of automation.

According to an aspect of the present disclosure, there is provided a method for creating resources, comprising: receiving a registration request; determining a registration type corresponding to the registration request; and creating, based on the registration type, a resource corresponding to the registration type.

According to another aspect of the present disclosure, there is provided a method for registration, comprising: sending a first registration request that includes a first registration type identifier; and receiving a first registration response so as to obtain information about a first resource created on a common service entity based on the first registration type identifier.

According to yet another aspect of the present disclosure, there is provided a server device, comprising a transceiver and a processor, wherein the transceiver is configured to receive a registration request; the processor is configured to determine a registration type corresponding to the registration request, and create, based on the registration type, a resource corresponding to the registration type.

According to yet another aspect of the present disclosure, there is provided a client device, comprising a transceiver and a processor, wherein the processor is configured to instruct the transceiver to send a first registration request that includes a first registration type identifier, and configured to instruct the transceiver to receive a first registration response so as to obtain information about a first resource created on a common service entity based on the first registration type identifier.

According to yet another aspect of the present disclosure, there is provided a computer-readable storage medium having stored thereon a computer program, when the computer program is executed by a processor, steps of the above-mentioned method for creating resources or steps of the above-mentioned method for registration are implemented.

BRIEF DESCRIPTION OF THE DRAWINGS

The embodiments of the present disclosure will be described in combination with the drawings so as to explain the principles of the present disclosure. It should be understood that the elements shown in the drawings may be implemented in various forms of hardware, software, or combinations thereof. Optionally, these elements are implemented in a combination of hardware and software on one or more appropriately programmed general-purpose computer devices.

DETAILED DESCRIPTION OF THE EMBODIMENTS

Hereinafter, the embodiments of the present disclosure will be described in combination with the drawings. In the following description, detailed descriptions of known functions and configurations may be omitted for clarity and conciseness. In addition, the following embodiments are intended to illustrate the present disclosure, not to limit the scope of the present disclosure. In fact, other implementations may be conceived of by those skilled in the art based on the following embodiments of the present disclosure. It will thus be appreciated that those skilled in the art will be able to devise various arrangements that, although not explicitly described or shown herein, embody the principles of the present disclosure and are included within its spirit and scope.

Figure 1:
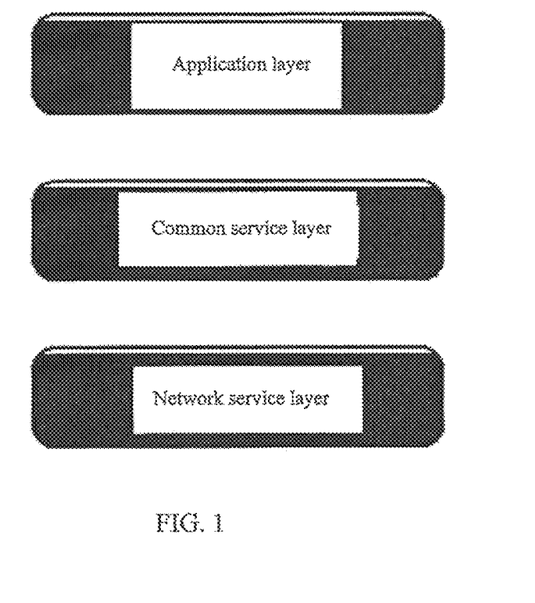
FIG. 1 schematically illustrates an IoT architecture.

FIG. 1 schematically illustrates an IoT architecture. As shown in FIG. 1, the IoT architecture mainly includes an application layer, a common service layer, and a network service layer, wherein the common service layer is located between the application layer and the network service layer, and interfaces upward with the application layer, and adopts downward the network connection service provided by the network service layer.

Figure 2:
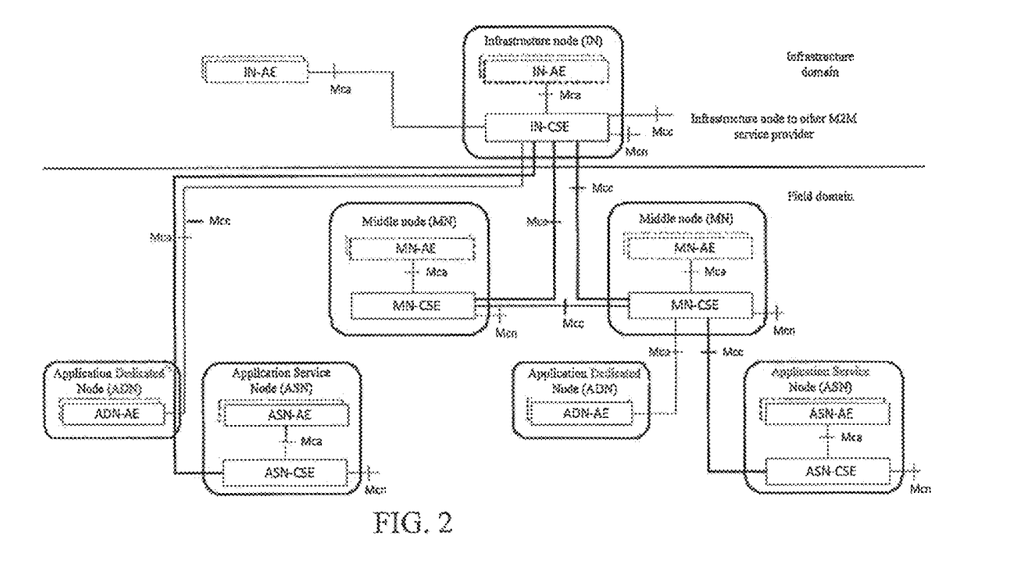
FIG. 2 schematically illustrates a specific configuration under the IoT architecture.

FIG. 2 schematically illustrates a specific configuration under the IoT architecture. Four types of nodes are comprised: Application Dedicated Node (ADN), Application Service Node (ASN), Middle Node (MN), and Infrastructure Node (IN). As shown in FIG. 2, each node is composed of one or more entities, wherein the entity includes three types: Application Entity (AE), Common Service Entity (CSE), and Network Service Entity (NSE). AE stands for business logic, and completes a specific job. CSE stands for universal service function. In order to use the functions provided by CSE, AE needs to register with CSE, one CSE may also register with another CSE so as to use functions provided by said another CSE.

According to a first aspect of the present disclosure, a method for creating resources is provided. Data flow of the method will be described in detail below with reference to FIG. 3.

Figure 3:
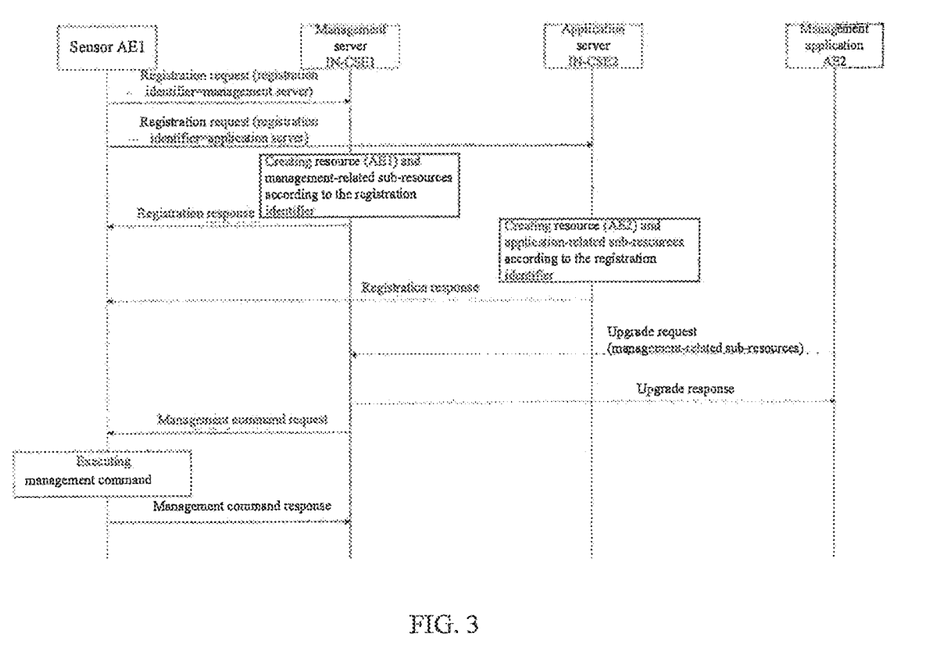
FIG. 3 schematically illustrates a process of registering an application entity on multiple service platforms in accordance with an embodiment of the present disclosure.

FIG. 3 schematically illustrates data flow of the method for creating resources in accordance with a first aspect of the present disclosure. In FIG. 3, it is shown that a management server IN-CSE1 providing management service and an application server IN-CSE2 providing application service respectively serve as a management service platform and an application service platform equipped for a node (e.g., a client including one or more application entities). In FIG. 3, only two servers are shown for ease of describing the principles of the present disclosure. However, it should be understood that the principles of the present disclosure may be applicable to the case of connecting more service platforms to a node (e.g., a client including one or more application entities). For example, the client includes a plurality of application entities, and the plurality of application entities respectively correspond to different services, such as data collection service, data processing service, and data distribution service, wherein the plurality of application entities may be respectively connected to a data collection service platform, a data processing service platform, and a data distribution service platform respectively.

Figure 4A:
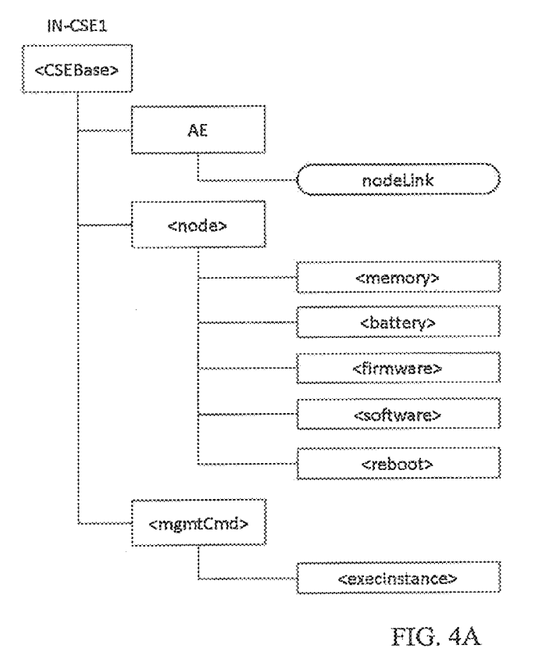
FIGS. 4A-4B schematically illustrate resources created for an application entity AE on a management service platform and an application service platform respectively in accordance with an embodiment of the present disclosure.

An application entity of the client can access a universal management service platform by means of, for example, sending a registration request. As shown in FIG. 3, the application entity AE1 may send a registration request to IN-CSE1 which serves as a management server, and the registration request includes a registration type identifier. As an example, the registration type identifier may indicate management registration. After receiving the registration request from AE1, the management server IN-CSE1 verifies it; if AE1's authority is verified, IN-CSE1 can create a resource(s) corresponding to AE1 according to the registration type identifier. When the registration type identifier indicates that the registration type belongs to management registration, as shown in FIG. 4A, resource <mgmtObj> instances related to management object may be created for AE under <CSEBase>/<node>. As an example, FIG. 4A only shows some <mgmtObj> instances, such as <memory>, <battery>, <firmware>, <software>, and <reboot>. However, the principles are not limited thereto, and may include other <mgmtObj> instances, such as <areaNWkInfo>, <areaNwkDeviceInfo>, <deviceInfo>, <deviceCapability>, and so on. In addition, in order to perform management control to AE1, resource <mgmtCmd> is also created under <CSEBase>, so that the corresponding management command can be sent to AE1. After the management resource(s) is created for AE1, the management server IN-CSE1 sends a registration response to AE1 so as to send to AE1 the information of having already successfully created management resource(s) for AE1.

Figure 4B:
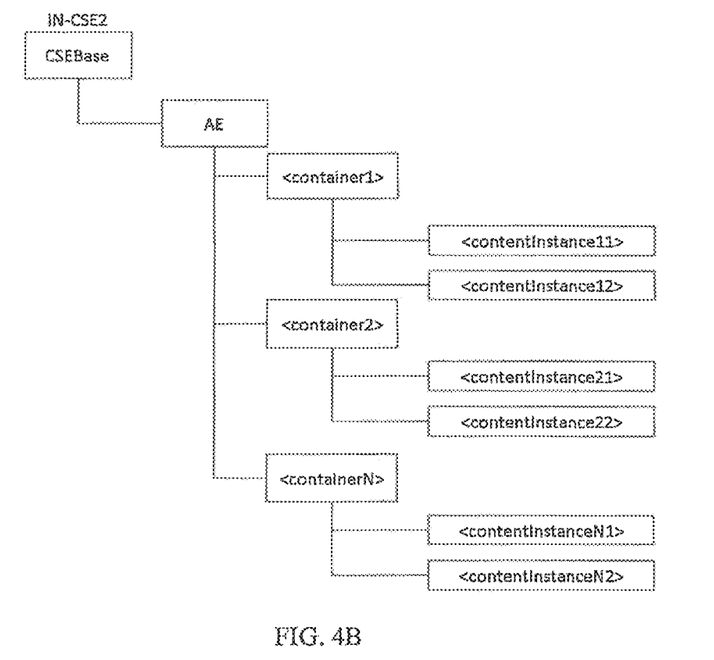

Further, in addition to executing a management request sent by the management server, the application entity AE1 of the client can receive an application request from the application server. For example, the application entity AE1 may receive a report content request sent by the application server. In this case, the application entity may send a registration request to IN-CSE2 which serves as an application server, so as to receive related services from the application server. For example, the registration request includes a registration type identifier, and the registration type identifier may indicate application registration, that is, the registration type identifier may indicate that the application entity AE1 receives application service from the application server. Similarly, after receiving the registration request from AE1, the application server IN-CSE2 verifies it; if AE1's authority is verified, IN-CSE2 can create a resource(s) corresponding to AE1 according to the registration type identifier. When the registration type identifier indicates that the registration type belongs to application registration, as shown in FIG. 4B, resource <AE> related to application object may be created for AE under <CSEBase>, specifically, resources <container1>, <container2> . . . <containerN> are created, and the resource type contentInstance is created under each resource, so that the application entity AE1 can be associated with the application server IN-CSE2. After the application resource is created for AE1, the application server IN-CSE2 sends a registration response to AE1 so as to send to AE1 the information of having already successfully created application resource for AE1.

As shown in FIG. 3, for example, when a certain management application AE2 initiates a request to manage related sub-resources to the management server IN-CSE1, for example, initiating a request to manage sub-resources of the application entity AE1, after the management server IN-CSE1 makes a verification, the management server IN-CSE1 sends a corresponding response, such as an update response, to the management application entity AE2. Subsequently, the management server IN-CSE1 sends a management command to the application entity AE1, after receiving the management command from the management server IN-CSE1, the application entity AE1 can execute a corresponding management project, and feed an execution result back to the management server IN-CSE1 in the form of a management command response.

Optionally, the management registration may include firmware management registration, software management registration, memory management registration, battery management registration, device information management registration, and so on.

Optionally, the application registration may also include location service registration, subscription notification service registration, discovery service registration, and so on.

The principles of the embodiment are to be described below in respect of specific examples. It is to be understood that, in order to illustrate the principles of the embodiments of the present disclosure, actual scenarios are simplified in the examples, and thus these examples should not be considered as limitations to the principles of the present disclosure.

For example, a charging function module of an electric vehicle may correspond to the application entity AE1, and a charging management software installed in the user's smartphone may correspond to the management application entity AE2, the application entities AE1 and AE2 may both access, for example, the universal charging management platform IN-CSE1. For example, the user may park the electric car in an underground garage and insert its charging plug into a charging post to charge the electric vehicle; and the user may return to a residence in the building since charging needs to take a while. In this scenario, the user may send an update request to the management server IN-CSE1 through the management application entity AE2 in the smartphone to learn a charging status of the electric vehicle. Meanwhile, other applications such as driving recorder, navigation map, etc. may have been installed on the electric vehicle, and may be taken as application entities AE3, AE4, . . . and the like.

The application entity AE1 may send a corresponding registration request to the management server IN-CSE1, the registration request includes a registration type identifier indicating that the registration type is management registration, so that a resource(s) related to management service is created for the application entity AE1 at the management server IN-CSE1. In addition, the application entity AE1 may also send a corresponding registration request to the application server IN-CSE2, the registration request includes a registration type identifier indicating that the registration type is application registration, so that a resource(s) related to application service is created for the application entity AE1 at the application server IN-CSE2. Thus, on the one hand, the application entity AE1 can receive the management command from the management server IN-CSE1, for example, querying the charging status of the battery, and can send relevant information to the management server, so that the user can further know the current charging status of the electric vehicle through the charging management software (e.g., corresponding to the management application AE2) of the smart phone; the application entity AE1 can also, in response to the report content request sent by the application server IN-CSE2, report information relating to a total number of times of charging of the battery, a total charging time of the battery, and the like to the application server IN-CSE2.

Thus, the application entity AE1 can be associated with the management server IN-CSE1 and the application server IN-CSE2 respectively, in order to receive services from the respective servers. In this embodiment, since the registration request sent by AE to CSE includes a registration type identifier indicating a corresponding registration type, CSE can create a corresponding resource(s) for AE according to the indicated registration type, thereby enabling the user of the terminal to control, on what service platform (e.g., a management server or an application server), what type of resource is to be created for the application entity and what type of service is to be received. Correspondingly, the user can share different information of the terminal to the corresponding service platform according to requirements, thereby realizing that the user terminal can access the universal management platform to receive the universal management service provided by the universal management platform, and also can receive a variety of application services from the application server without worrying about leaking information about application services to the universal management service platform.

In the above embodiment, the type of the resource to be created for the application entity AE1 is indicated by the registration type identifier included in the registration request sent to the management servers IN-CSE1 and IN-CSE2 by the application entity AE1. In other words, the registration type corresponding to the registration request is determined based on the registration type identifier carried in the received registration request. Optionally, the server may determine the registration type corresponding to the registration request based on the service type corresponding to the server itself. This case applies when the registration request sent by the application entity AE1 does not contain a registration type identifier that explicitly indicates the registration type. In this case, when receiving the registration request from the application entity AE1, if it is found that the registration type identifier is not included or the registration type indicated by the registration type identifier is not indefinite, the server CSE may provide the corresponding service to the application entity AE1 based on the service type set by itself. For example, if the server CSE has been set as the management server, then management service may be provided to the application entity AE1, that is, a resource(s) related to management service may be created for the application entity AE1; and if the server CSE has been set as the application server, application service may be provided to the application entity AE1, that is, a resource(s) related to application service may be created for the application entity AE1.

In the embodiment shown in FIG. 3, the application entity AE1 sends a registration request with a registration type of management registration and a registration request with a registration type of application registration to the management server IN-CSE1 and the application server IN-CSE2 respectively, so as to create a resource(s) related to management service on the management server and create a resource(s) related to application service on the application server separately.

The sending of the two registration requests may be synchronous, without affecting each other, so that creating a resource(s) on the management server and creating a resource(s) on the application server may be parallel.

Figure 5:
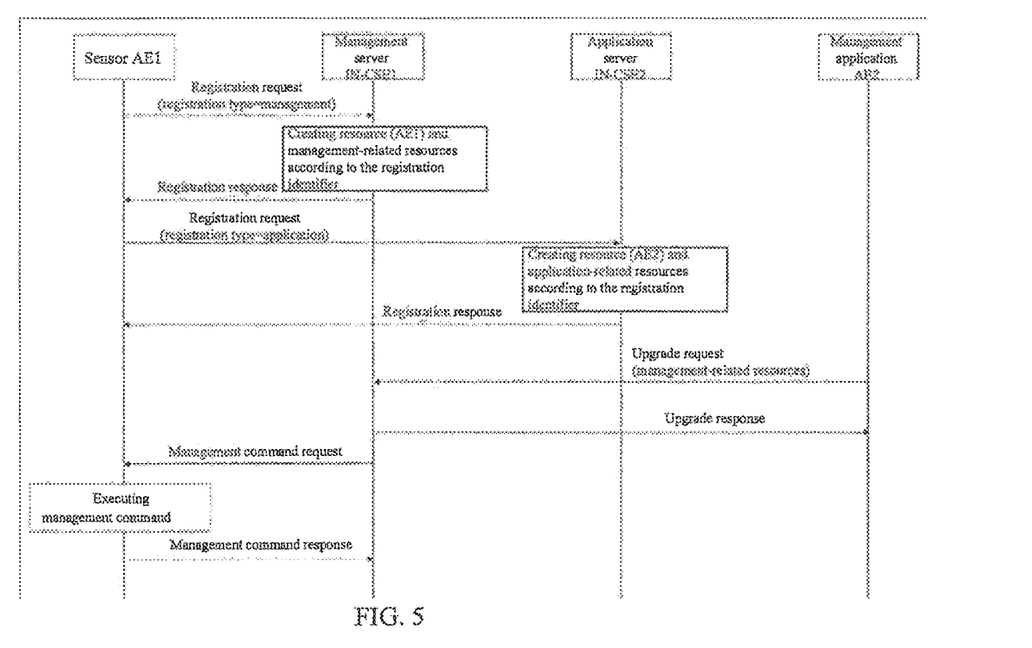
FIG. 5 schematically illustrates a process of registering an application entity on multiple service platforms in accordance with another embodiment of the present disclosure.

As a variant, a way of sequentially sending two registration requests may be employed so that the management server IN-CSE1 and the application server IN-CSE2 can be associated. For example, as shown in FIG. 5, the application entity AE1 first sends a registration request with a registration type of management registration to the management server IN-CSE1 so as to create a corresponding resource(s) related to management service on the management server IN-CSE1. After successfully creating the corresponding management resource for the application entity AE1, the management server IN-CSE1 sends a registration response to the application entity AE1. After receiving the registration response from the management server IN-CSE1, the application entity AE1 then sends a registration request with a registration type of application registration to the application server IN-CSE2 so as to create a resource(s) related to application service for the application entity AE1 on the application server IN-CSE2. In this way, the management server IN-CSE1 can be associated with the application server IN-CSE2. For example, in the registration response sent by the management server IN-CSE1 to the application entity AE1, information about the management server IN-CSE1, such as URI of the management server IN-CSE1, may be included, so that when the application entity AE1 sends a registration request to the application server IN-CSE2, the information about the management server IN-CSE1 can be embedded therein, for example, URI of the management server IN-CSE1, so that the application server IN-CSE2 obtains the information of the management server IN-CSE1, and thereby can access the management server IN-CSE1 when necessary.

Optionally, it is also possible that the registration response sent by the management server IN-CSE1 to the application entity AE1 does not include information related to the management server IN-CSE1, for example, URI of the management server IN-CSE1 is not included, but the application entity AE1 may send a query request to the management server IN-CSE1 to obtain information of the management server IN-CSE1 when necessary, and when it is needed to associate the management server IN-CSE1 and the application server IN-CSE2, the application entity AE1 sends an association request to the management server IN-CSE1 or the application server IN-CSE2, so as to associate the management server IN-CSE1 and the application server IN-CSE2 with each other.

As an instance, for example, the user's smart home appliance client (e.g., a portable indoor air purifier) acts as the application entity AE1, which sends a registration request to the universal management server IN-CSE1 so that resources related to management such as <AE1>, <node1> are created on the management server IN-CSE1. For example, as shown in FIG. 4A, resources such as <memory>, <battery>, <firmware>, <software>, and <reboot> may be created for the smart home appliance. The resource <memory> is used to share information about the memory of the smart home appliance, the resource <battery> is used to share information about the battery of the smart home appliance, the resource <firmware> is used to share information about the firmware of the smart home appliance, the resource <software> is used to share information about the software of the smart home appliance, and the resource <reboot> involves information to restart the smart home appliance. After the registration is completed, the management server IN-CSE1 returns a registration response to the smart home appliance AE1.

Thereafter, the smart home appliance AE1 sends a registration request to the application server IN-CSE2 so as to create a resource <AE2> and associated sub-resources on the application server IN-CSE2. For example, as shown in FIG. 4B, under AE, a plurality of resources <container> and associated <contentInstance> are created, so that application service can be provided for the smart home appliance. For example, the application entity AE1 may upload the detected air quality information to IN-CSE2, for example, for being stored in the created <contentInstance>, and receive other application services provided by IN-CSE2. After the resource of an application type is created for the application entity, the application server IN-CSE2 returns a registration response.

When the user initiates a management request by using the management application AE2, for example, the user may initiate a management request by using the management program (corresponding to the management application AE2) of the smart home appliance installed in the tablet, for example, a management request of updating the firmware of the smart home appliance AE1 may be initiated. At this time, the management application AE2 sends an update request to the management server IN-CSE1, and after the corresponding authority verification is passed, the management application AE2 receives an update response from the management server IN-CSE1. At the same time, the management server IN-CSE1 sends a management command request to the application entity AE1, for example, an update command for updating the firmware of the smart home appliance; accordingly, the smart home appliance performs a management project for updating its firmware, and feeds an execution result back to the management server IN-CSE1 as a management command response.

Considering that after the same one application entity AE1 registers with the management server IN-CSE1 and the application server IN-CSE2 respectively, it can receive the management service provided from the management server IN-CSE1 on the one hand, and receive the application service provided by the application server IN-CSE2 on the other hand. However, when the application entity is receiving a management command from the management server IN-CSE1 while it is receiving the application service, a conflict may be caused. Taking the above instance as an example, when the smart home appliance (e.g., a portable air purifier) AE1 is being used to purify the indoor air by the user, another management application AE2 may initiate the update request of updating the firmware of the smart home appliance to the management server IN-CSE1. Such update may be based on a user setting that the management application AE2 periodically queries the version of the firmware provided by the management server IN-CSE1 for the smart home appliance and automatically updates the firmware of the smart home appliance when a new version of the firmware is found. Another embodiment of the present disclosure provides a solution for such situation where a conflict may occur, which will be described in detail below in conjunction with FIG. 6.

In order to avoid the situation where a conflict may occur when the application entity AE1 receives the management service and the application service concurrently, an embodiment of the present disclosure provides that: by associating the management server IN-CSE1 that provides management service and the application server IN-CSE2 that provides application service, when one type of services is to be executed by the application entity AE1, status corresponding to the other type of services can be queried from the server corresponding to the other type of services, thereby application entity AE1 can be reasonably scheduled to receive the corresponding command and execute the corresponding project, thus avoiding the occurrence of a conflict.

Figure 6:
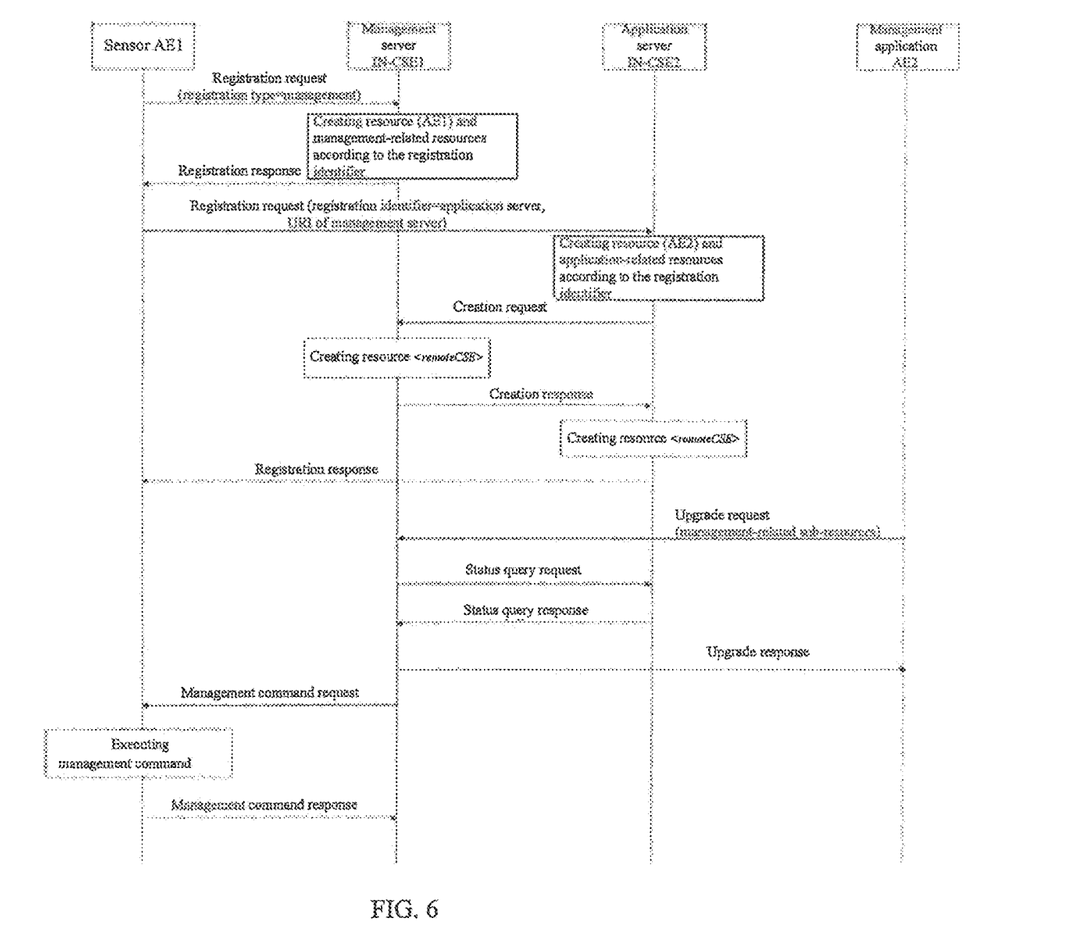
FIG. 6 schematically illustrates a process of registering an application entity on multiple service platforms in accordance with yet another embodiment of the present disclosure.

As shown in FIG. 6, the application entity AE1 sends a registration request to the management server IN-CSE1 so as to create a corresponding management resource(s) on the management server IN-CSE1; after the management server IN-CSE1 determines that the registration type corresponding to the registration request is management registration, the management server IN-CSE1 creates management-related resources such as <AE1>, <node1> for AE1, for example, creating resources as shown in FIG. 4A, and returns a registration response to the application entity AE1.

After receiving the registration response from the management server IN-CSE1, the application entity AE1 registers with the application server IN-CSE2, where the registration request includes a registration type identifier and information about the management server IN-CSE1, such as URI corresponding to the management server IN-CSE1; after the application server IN-CSE2 determines that the registration type corresponding to the registration request is application registration, the application server IN-CSE2 creates a resource(s) <AE2> and an application-related resource(s) for the application entity AE1, for example, creating resources as shown in FIG. 4B.

Further, based on the received information about the management server IN-CSE1, for example, based on the received URI of the management server IN-CSE1, the application server IN-CSE2 sends a request to the management server IN-CSE1, thereby a resource <remoteCSE> representing the application server IN-CSE2 is created on the management server IN-CSE1, so as to register the application server IN-CSE2 on the management server IN-CSE1. Accordingly, the management server IN-CSE1 creates a resource <remoteCSE> and returns a creation response. After receiving the creation response from the management server IN-CSE1, the application server IN-CSE2 locally creates a resource <remoteCSE> representing the management server IN-CSE1, thereby completing the registration process of the management server IN-CSE1 on the application server IN-CSE2. Thereafter, the application server IN-CSE2 returns a registration response to the application entity AE1, indicating that registration of the application entity AE1 is completed on the application server IN-CSE2.

When the management application AE2 sends an update request to the management server IN-CSE1 such that the management server IN-CSE1 sends a command of executing the corresponding management project to the application entity AE1, in order to avoid possible conflicts with execution of the related application service project if the application entity executes the management project, the management server IN-CSE1 sends a status query request to the application server IN-CSE2 to learn the application service project currently being executed by the application entity AE1. Correspondingly, after the authority verification is passed, the application server IN-CSE2 returns a status query response to the management server IN-CSE1, such that the application service project currently being executed by the application entity AE1 is notified to the management server IN-CSE1. After processing at the management server IN-CSE1, in case that it is determined whether there is a conflict, and a determination result is sent as an update response to the management application AE2. Thereby, the management application AE2 receives the update response sent by the management server IN-CSE1. On the other hand, in case that it is determined that there is no conflict, the management server IN-CSE1 sends a management command request to the application entity AE1, so as to instruct the application entity AE1 to execute the management project requested by the management application AE2; correspondingly, the application entity AE executes the requested management project and sends an execution result as a management command response to the management server IN-CSE1.

The principles of the embodiment will be described in detail below in conjunction with the above examples. For example, the user's smart home appliance (e.g., an access control camera) can be used as the application entity AE1, which sends a registration request to the universal management server IN-CSE1 so as to create management-related resources such as <AE1>, <node1> on the management server IN-CSE1. For example, as shown in FIG. 4A, resources such as <memory>, <battery>, <firmware>, <software>, and <reboot> may be created for the application entity AE1.

After the registration is completed, the management server IN-CSE1 returns a registration response to the application entity AE1. Then, after receiving the registration response from the management server IN-CSE1, the application entity AE1 registers with the application server IN-CSE2, where the registration request includes a registration type identifier and information about the management server IN-CSE1, such as URI corresponding to the management server IN-CSE1, so as to create a resource <AE2> and associated sub-resources on the application server IN-CSE2, and associate the application server IN-CSE2 with the management server IN-CSE1. For example, as shown in FIG. 4B, a plurality of resources <container> under <AE> and an associated <contentInstance> are created, so that the application entity AE1 can be provided with application service. For example, the application entity AE1 uploads the captured photo and video to the application server IN-CSE2 in response to the request of the application server IN-CSE2. After the application server IN-CSE2 determines that the registration type corresponding to the registration request is application registration, a resource <AE2> and an application-related resource are created for the application entity AE1, for example, creating resources as shown in FIG. 4B.

Further, based on the received information about the management server IN-CSE1, for example, based on the received URI of the management server IN-CSE1, the application server IN-CSE2 sends a request to the management server IN-CSE1 to create a resource <remoteCSE> representing the application server IN-CSE2 on the management server IN-CSE1, so as to register the application server IN-CSE2 with the management server IN-CSE1. Accordingly, the management server IN-CSE1 creates a resource <remoteCSE> and returns a creation response; after receiving the creation response from the management server IN-CSE1, the application server IN-CSE2 locally creates a resource <remoteCSE> representing the management server IN-CSE1, thus completing the registration process of the management server IN-CSE1 on the application server IN-CSE2. So, the application server IN-CSE2 is associated with the management server IN-CSE1. Then, the application server INT-CSE2 returns a registration response to the application entity AE1.

For example, when the user needs to synchronize a version of a software on the smart home appliance (e.g., the access control camera) as a version of the same software on the tablet, when the version of the software on the tablet has been updated and the version of the software on the smart home appliance needs to be automatically updated, a management request is initiated by using an application installed in the tablet (e.g., serving as the management application AE2), for example, a management request for updating the version of the software on the smart home appliance may be initiated. At this time, the management application AE2 sends an update request to the management server IN-CSE1, and after the corresponding authority verification is passed, in order to avoid a possible conflict with execution of the application service project (e.g., uploading the taken photo) if the smart home appliance performs the software update, the management server IN-CSE1 sends a status query request to the application server IN-CSE2 so as to learn the application service project currently being executed by the application entity. Correspondingly, after the authority verification is passed, the application server IN-CSE2 returns a status query response to the management server IN-CSE1 to notify the management server IN-CSE1 of the application service project currently being executed by the application entity AE1. After processing at the management server IN-CSE1, it is determined whether there is a conflict, for example, it is determined whether the smart home appliance is currently using the software. If the software is not currently used, it is determined that there is no conflict, and a determination result is sent as an update response to the tablet management application AE2; thus, the management application AE2 receives an update response IN-CSE1 sent by the management server IN-CSE1. Meanwhile, in the case where it is determined that there is no conflict, the management server IN-CSE1 sends a management command request to the application entity AE1, instructing the application entity AE1 to execute a management project for updating the version of the software. On the other hand, if it is determined that there is a conflict, a determination result may be fed back to the management application AE2, so that update is to be performed after waiting for a period of time; or the user of the application entity AE1 is prompted with information of updating the version, the user chooses whether to close the application now so as to perform version update. Accordingly, the application entity AE executes the requested management project for updating the version of the software, and sends an execution result as a management command response to the management server IN-CSE1.

In the above embodiment, in the registration request sent to the application server IN-CSE2 by the application entity AE1, information about the previously registered management server IN-CSE1 is included, so that the management server and the application server can be associated, and when the management server is going to instruct the application entity AE1 to execute the management command from, the management server queries the application server to determine whether the management service project to be executed by AE1 may have a conflict with the application service project currently being executed by AE1. When it is determined that there is no conflict, the application entity AE1 may execute the management service project, which ensures compatibility of application entities on multiple platforms.

Figure 7:
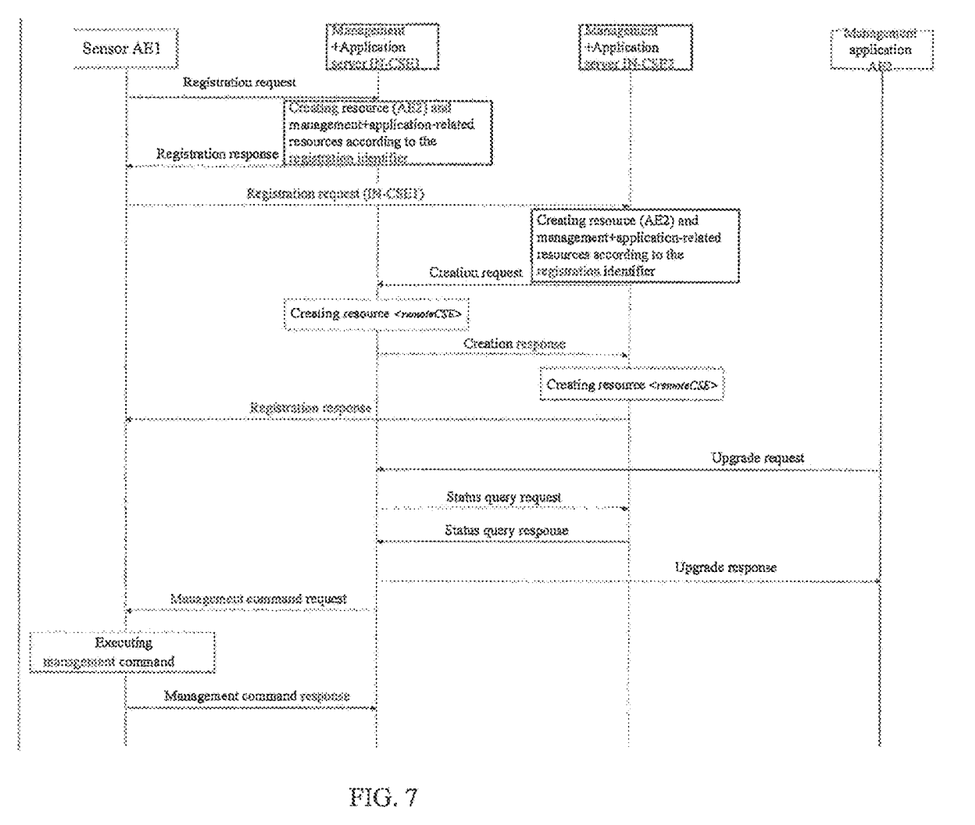
FIG. 7 schematically illustrates a process of registering an application entity on multiple service platforms in accordance with yet another embodiment of the present disclosure.

In the above description of the principles of the present disclosure in conjunction with FIGS. 3-6, the management server and the application server are divided into different common service entities CSE, i.e., the management server IN-CSE1 separately provides management-related service, and the application server IN-CSE2 separately provided application-related service. In fact, the same one server (service platform) is likely to provide both management service and application service, that is, as an integrated service platform, not only can provide management service to application entities but also can provide application service to application entities. FIG. 7 shows this case.

Specifically, the main difference between FIG. 7 and FIG. 6 lies in: the servers IN-CSE1 and IN-CSE2, which serve as service platforms, are integrated servers, and are capable of providing not only management service but also application service to application entities.

Figure 8:
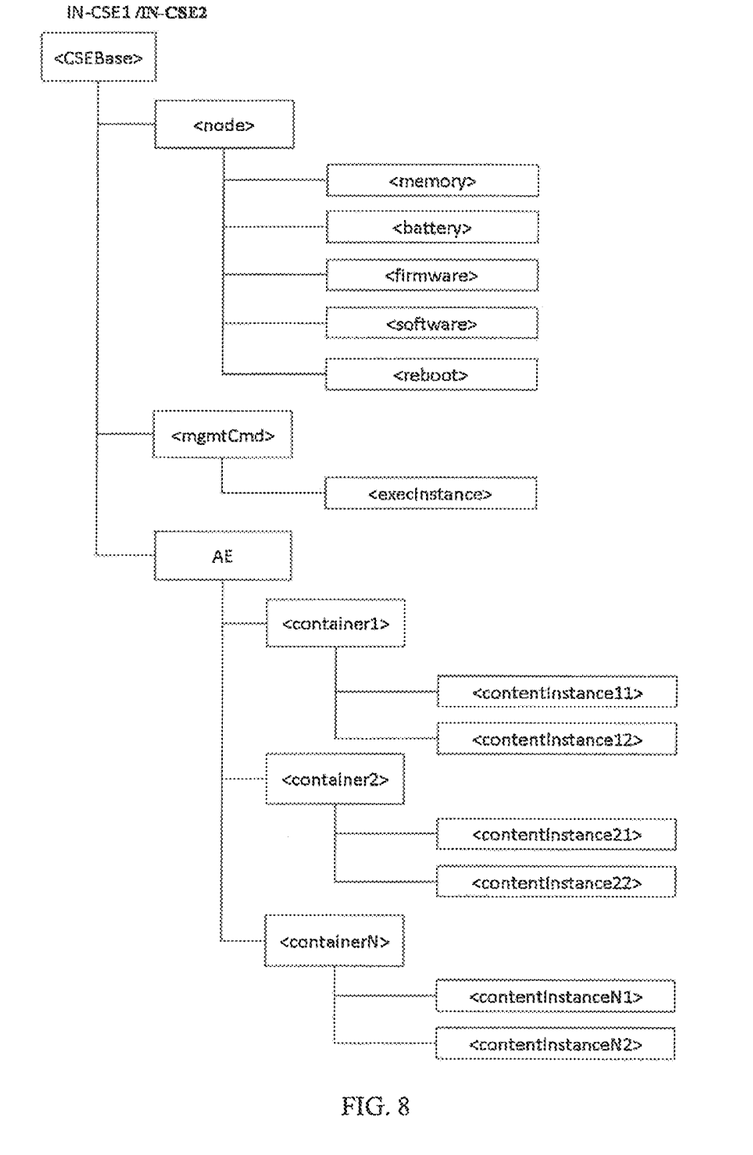
FIG. 8 illustrates resources created for an application entity AE on an integrated service platform in accordance with an embodiment of the present disclosure.

As shown in FIG. 7, the application entity AE1 sends a registration request to the integrated server IN-CSE1 so as to create a corresponding resource(s) on the integrated server IN-CSE1. After receiving the registration request from the application entity AE1, the integrated server IN-CSE1 determines a resource type to be created for the application entity AE1. For example, the integrated server IN-CSE1 determines a resource type to be created for the application entity AE1 based on a service type corresponding to CSE itself. For example, based on that the integrated server IN-CSE1 itself corresponds to an integrated server, IN-CSE1 creates a sub-resource(s) related to management service and a sub-resource(s) related to application service for AE1. For example, as shown in FIG. 8, the resource created for the application entity AE1 under IN-CSE1 includes not only the sub-resources related to management service, <memory>, <battery>, firmware>, <software>, <reboot>, <mgmtCmd>, etc., but also includes the sub-resources related to application service, <container> and the sub-resource <contentInstance> thereof. Thus, for the registration request of the application entity AE1, management-plus-application registration is performed on the integrated server IN-CSE1.

Similarly, when the application entity AE1 sends a registration request to the integrated server IN-CSE2 for registration, the integrated server IN-CSE2 also creates sub-resources related to management service, <memory>, <battery>, <firmware>, <software>, <reboot>, <mgmtCmd>, etc., for the application entity AE1, and sub-resources related to application service, <container> and the sub-resource <contentInstance> thereof.

Thus, either one of the integrated servers IN-CSE1 and IN-CSE2 can provide not only management service but also application service for the application entities. Of course, the server IN-CSE1 or IN-CSE2, for example, may provide different management service projects for the application entity AE1, and may also provide different application service projects for the application entity AE1.

The other processes shown in FIG. 7 are similar to the corresponding processes shown in FIG. 6, and specific details are not described herein.

The principles of the embodiment will be specifically described below with reference to examples.

For example, the set top box in the user's home may serve as the application entity AE1, which sends a registration request to the integrated server IN-CSE1 such that resources related to application service such as <memory>, <battery>, <firmware>, <software>, <reboot>, <mgmtCmd>, as well as resources related to management service such as <container>, <contentInstance> and so on as shown in FIG. 8 are created on the integrated server IN-CSE1. After completing the registration, the server IN-CSE1 returns a registration response to the set top box AE1.

Then, after receiving the registration response from the server IN-CSE1, the application entity AE1 registers with the integrated server IN-CSE2 such that a resource <AE2> and associated sub-resources are created on the server IN-CSE2, for example, resources related to management service such as <memory>, <battery>, <firmware>, <software>, <reboot>, <mgmtCmd>, and resources related to application service such as <container>, <contentInstance>, as shown in FIG. 8.

The registration request includes information about the integrated server IN-CSE1, such as the URI corresponding to the server IN-CSE1. Based on the received information about the server IN-CSE1, for example, based on the received URI of the server IN-CSE1, the server IN-CSE2 sends a request to server IN-CSE1 so as to create a resource <remoteCSE> representing server IN-CSE2 on the server IN-CSE1, thus registering the server IN-CSE2 on the server IN-CSE1. Accordingly, the server IN-CSE1 creates the resource <remoteCSE> and returns a creation response. After receiving the creation response from the server IN-CSE1, the server IN-CSE2 locally creates a resource <remoteCSE> representing the server IN-CSE1, thereby completing the process of registering the server IN-CSE1 on the server IN-CSE2. So, the integrated server IN-CSE2 is associated with the integrated server IN-CSE1. Thereafter, the server IN-CSE2 returns a registration response to the application entity AE1.

Thus, for the application entity AE1, management-plus-application registration is performed on both the server IN-CSE1 and the server IN-CSE2.

As described above, according to requirements, the servers IN-CSE1 and IN-CSE2, for example, may provide different management service projects for the application entity AE1, and may also provide different application service projects. For example, both IN-CSE1 and IN-CSE2 may be able to provide management service for version update of a certain software of the set-top box of the application entity AE1, and may also provide different software application services for the set-top box AE1, for example, IN-CSE1 can provide Video-on-demand related application service, while IN-CSE2 can provide application service for storing video data that the user has viewed.

The user can use the set top box management software installed in the smartphone as the management application AE2 to initiate an update request for the software of the set top box AE1 to the integrated server IN-CSE1. For example, when an update request is sent to the server IN-CSE1 through the management application AE2, after the corresponding authority verification is passed, the server IN-CSE1 may send a status inquiry request to the server IN-CSE2 to compare two versions of the software that are provided on the servers IN-CSE1 and IN-CSE2 respectively, so that the latest version is selected to update the software of the set-top box. Correspondingly, after the authority verification is passed, the server IN-CSE2 returns a status query response to the server IN-CSE1, and notifies the server IN-CSE1 of the information of the version that it can provide. Then, the server IN-CSE1 determines which version is up-to-date, and sends a determination result as an update response to the management application AE2, and thereby the management application AE2 receives the update response sent by the management server IN-CSE1. In case that the server IN-CSE1 determines that the version provided by itself is the latest, it sends a management command request to the application entity AE1, instructing the application entity AE1 to execute a management project for updating the version of the software. In case that the server IN-CSE1 determines that the version provided by the server IN-CSE2 is the latest, a management command request can be sent from the server IN-CSE2 to the application entity AE1, instructing the application entity AE1 to execute a management project for updating the version of the software. Accordingly, the application entity AE receives the management command request and executes the management project that requests updating of the version of the software, and sends an execution result to the server IN-CSE1 or the server IN-CSE2 as a management command response.

In the above embodiment, information about the previously registered integrated server IN-CSE1 is included in the registration request sent by the application entity AE1 to the integrated server IN-CSE2, so that the server IN-CSE1 and the server IN-CSE2 can be associated. And when the server IN-CSE1 is going to instruct the application entity AE1 to execute a management service command or an application service command, it queries the server IN-CSE2 to determine whether the service project to be executed by the AE1 may conflict with the service project currently being executed by the AE1. In case that it is determined that there is no conflict, the service project from the server IN-CSE1 can be directly executed, compatibility of the application entity on multiple platforms is ensured.

Figure 9:
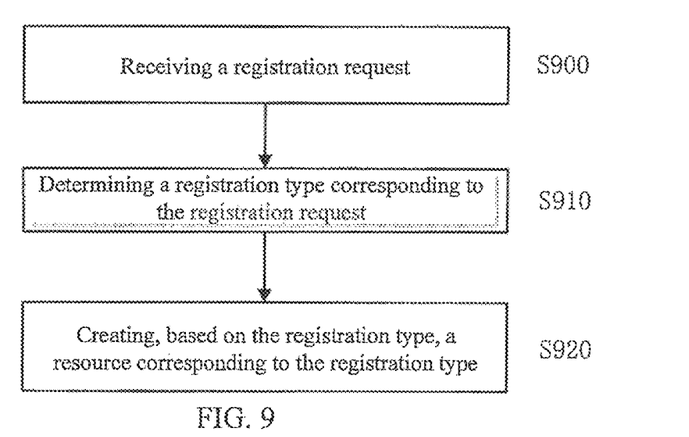
FIG. 9 illustrates a schematic flow of a method for creating resources according to an embodiment of the present disclosure.

FIG. 9 illustrates a schematic flow of a method for creating resources according to an embodiment of the present disclosure. As shown in FIG. 9, the method comprises: S900, receiving a registration request; S910, determining a registration type corresponding to the registration request; S920, creating, based on the registration type, a resource(s) corresponding to the registration type.

Optionally, the above method further comprises: classifying resources, and determining a resource type(s) corresponding to the registration type.

Optionally, in the above method, the registration type includes management registration, application registration, management-plus-application registration.

Optionally, the management registration may include firmware management registration, software management registration, memory management registration, battery management registration, device information management registration, and so on.

Optionally, the application registration may also include location service registration, subscription notification service registration, discovery service registration, and so on.

Optionally, in the above method, in case that it is determined that the registration type belongs to management registration, a first resource corresponding to a management service type is created on a first common service entity.

Optionally, in the above method, in case that it is determined that the registration type belongs to application registration, a second resource corresponding to an application service type is created on a first common service entity.

Optionally, in the above method, in case that it is determined that the registration type belongs to management-plus-application registration, a first resource corresponding to a management service type and a second resource corresponding to an application service type are created on a first common service entity.

Optionally, in the above method, the registration type corresponding to the received registration request is determined based on a registration type identifier carried in the registration request.

Optionally, in the above method, the registration type corresponding to the registration request is determined based on a service type corresponding to the first common service entity itself.

Optionally, the above method further comprises: receiving a request from a management application, and sending a management command to an application entity.

Optionally, the above method further comprises: associating the first common service entity with a second common service entity based on information about the second common service entity as included in the registration request.

Optionally, in the above method, associating the first common service entity with a second common service entity comprises: sending a request to the second common service entity so as to register the first common service entity on the second common service entity.

Optionally, the above method further comprises: in response to a query request of the second common service entity, sending a status of the first common service entity to the second common service entity.

Figure 10:
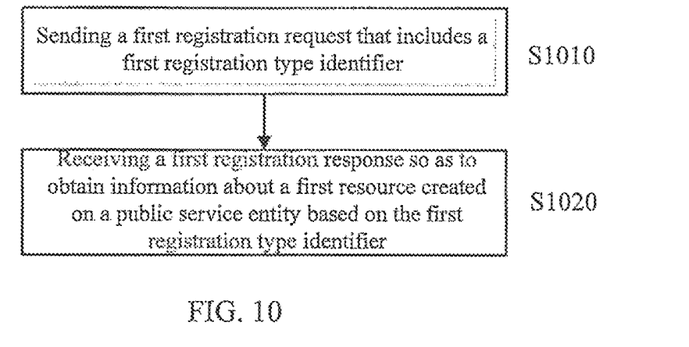
FIG. 10 illustrates a schematic flow of a method for registration in accordance with an embodiment of the present disclosure.

FIG. 10 illustrates a schematic flow of a method for registration in accordance with an embodiment of the present disclosure. As shown in FIG. 10, the method comprises: S1010, sending a first registration request that includes a first registration type identifier; S1020, receiving a first registration response so as to obtain information about a first resource created on a common service entity based on the first registration type identifier.

Optionally, the above method further comprises: sending a second registration request that includes a second registration type identifier, the second registration type identifier indicating the same register type as the first registration type identifier or indicating a different registration type than the first registration type identifier; and receiving a second registration response so as to obtain information about a second resource created at a common service entity based on the second registration type.

Optionally, in the above method, the registration type is one of the following: management registration, application registration, management-plus-application registration.

Optionally, in the case where the registration type involves management registration, the above method further comprises: receiving a management command from the common service entity, and executing a corresponding management project.

Optionally, in the above method, the first registration request and the second registration request are sent in parallel so as to create a first resource and a second resource for the application entity on a first common service entity and a second common service entity; respectively.

Optionally, the above method further comprises: sending an association request to the first common service entity or the second common service entity so as to associate the first common service entity with the second common service entity).

Optionally, in the above method, one of the first registration request and the second registration request is sent first, and after a registration success response is received, the other of the first registration request and the second registration request is subsequently sent, so as to create a first resource and a second resource for the application entity on a first common service entity and a second common service entity, respectively.

Optionally, in the above method, the registration request that is sent subsequently further includes information about the common service entity corresponding to the registration request that is sent first, so as to associate the first common service entity with the second common service entity.

Figure 11:
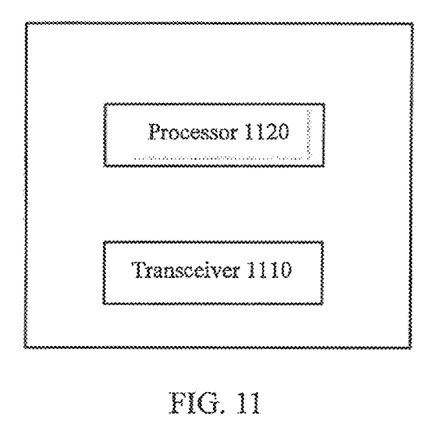
FIG. 11 is a schematic block diagram of a server device in accordance with an embodiment of the present disclosure.

FIG. 11 is a schematic block diagram of a server device in accordance with an embodiment of the present disclosure. As shown in FIG. 11, the server device comprises a transceiver 1110 and a processor 1120, the transceiver receives a registration request; the processor 1120 determines a registration type corresponding to the registration request, and creates, based on the registration type, a resource(s) corresponding to the registration type.

Optionally, the above sever device may also have a built-in or external memory for storing resources created for the application entity, and storing related instructions which, when executed by the processor, cause steps of the above method for creating resources to be implemented.

Figure 12:
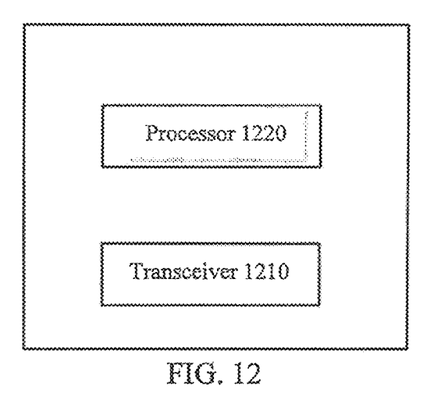
FIG. 12 is a schematic block diagram of a client device in accordance with an embodiment of the present disclosure.

FIG. 12 is a schematic block diagram of a client device in accordance with an embodiment of the present disclosure. As shown in FIG. 12, the client device comprises a transceiver 1210 and a processor 1220, the processor 1220 instructs the transceiver 1210 to send a first registration request that includes a first registration type identifier, and instructs the transceiver 1210 to receive a first registration response so as to obtain information about a first resource(s) created on a common service entity based on the first registration type identifier.

Optionally, the above client device may also have a built-in or external memory for storing related instructions which, when executed by the processing, cause steps of the above method for registration to be implemented.

In accordance with another embodiment of the present disclosure, there is further provided a computer-readable storage medium having stored thereon a computer program, when the computer program is executed by a processor, steps of the method for creating resources described above or steps of the method for registration described above.

With the methods and devices provided by the embodiments of the present disclosure, different platform functions can be obtained by means of registering on different platforms, thus achieving cooperation management of different platforms for the same device, avoiding inconvenience of use caused by the isolation of multiple device platforms, and improving the level of automation.

Thus it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudo-code, and the like represent various processes which may be substantially represented in computer readable media and so executed by a computer or processor, whether or not such computer or processor is explicitly shown. The written computer readable medium and codes may be implemented in a transient state (signal) and a non-transient state (e.g., on a tangible medium such as a CD-ROM, DVD, Blu-ray, hard disk drive, flash memory card, or other type of tangible storage medium).

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

Although the embodiment which incorporates the teachings of the present disclosure has been shown and described in detail herein, those skilled in the art can readily devise many other varied embodiments that still incorporate these teachings. It is noted that modifications and variations can be made by persons skilled in the art in light of the above teachings.

Some specific embodiments have been described above. But it should be understood that modifications may be made to these embodiments. For example, elements of different embodiments may be combined, supplemented, modified, and deleted to obtain other embodiments. In addition, it will be understood by those of ordinary skill in the art that other structures and processes may be used in place of the structures and processes that have been disclosed above to obtain resulting embodiments. The resulting embodiments at least achieve substantially the same function in substantially the same way, so as to achieve substantially the same effect provided by the embodiments disclosed in the present disclosure. Accordingly, these and other embodiments should be within the scope of the present disclosure.

The present application claims priority of the Chinese Patent Application No. 201710632554.7 filed on Jul. 28, 2017, the entire disclosure of which is hereby incorporated in full text by reference as part of the present application.

What is claimed is:

1. A method for creating resources on a common service entity for Internet of Things, comprising:
    receiving, from an application entity, a registration request;
    based on a registration type identifier carried in the received registration request or a service type corresponding to the common service entity itself, determining a registration type corresponding to the registration request;
    determining a resource type corresponding to the registration type;
    in response to that it is determined that the registration type belongs to a management registration, creating a resource of the resource type corresponding to a management service type on the common service entity;
    in response to that it is determined that the registration type belongs to an application registration, creating a resource of the resource type corresponding to an application service type on the common service entity; and
    in response to that it is determined that the registration type belongs to a management-plus-application registration, creating a resource of the resource type corresponding to a management service type and a resource of the resource type corresponding to an application service type on a common service entity,
    wherein the resource corresponding to a management service type provides management service to the application entity, and the resource corresponding to an application service type provides an application service to the application entity.

2. The method according to claim 1, wherein the common service entity is a first common service entity,
    in response to that it is determined that the registration type belongs to the management registration, a first resource corresponding to a management service type is created on the first common service entity;
    in response to that it is determined that the registration type belongs to the application registration, a second resource corresponding to an application service type is created on the a first common service entity; and
    in response to that it is determined that the registration type belongs to the management-plus-application registration, a first resource corresponding to a management service type and a second resource corresponding to an application service type are created on the first common service entity.

3. The method according to claim 2, wherein the registration request includes information about a second common service entity, and the method further comprises:
    associating the first common service entity with the second common service entity based on the information about the second common service entity as included in the registration request.

4. The method according to claim 3, wherein associating the first common service entity with the second common service entity comprises:
    sending a request to the second common service entity so as to register the first common service entity on the second common service entity.

5. The method according to claim 4, further comprising:
    in response to a query request for an application entity of the second common service entity, sending a status of the application entity from the first common service entity to the second common service entity, wherein the application entity has registered to the first common service entity and the second common service entity.

6. A method for registration, comprising:
    sending a first registration request that includes a first registration type identifier; and
    receiving a first registration response so as to obtain information about a first resource created on a common service entity of claim 1 based on the first registration type identifier.

7. The method according to claim 6, wherein the common service entity is a first common service entity, the method further comprises:
    sending a second registration request that includes a second registration type identifier, the second registration type identifier indicating the same register type as the first registration type identifier or indicating a different registration type than the first registration type identifier; and
    receiving a second registration response so as to obtain information about a second resource created at a second common service entity based on the second registration type.

8. The method according to claim 7, wherein the registration type is one of the following: management registration, application registration, and management-plus-application registration.

9. The method according to claim 8, wherein in the case where the registration request is sent by an application entity and the registration type involves management registration, the method further comprises:
    receiving a management command for the application entity, and executing a corresponding management project.

10. The method according to claim 7, wherein the first registration request and the second registration request are sent in parallel by an application entity so as to create the first resource and the second resource for the application entity on the first common service entity and the second common service entity, respectively.

11. The method according to claim 10, further comprising:
    sending an association request to the first common service entity or the second common service entity so as to associate the first common service entity with the second common service entity.

12. The method according to claim 7, wherein the first registration request is sent first by an application entity, and after a registration success response is received, the second registration request is subsequently sent by the application entity, so as to create the first resource and the second resource for the application entity on the first common service entity and the second common service entity, respectively.

13. The method according to claim 12, wherein the second registration request further includes information about the first common service entity, so as to associate the first common service entity with the second common service entity.

14. A server device for performing the method of claim 1, comprising a transceiver and a processor, wherein the transceiver is configured to receive a registration request; the processor is configured to determine a registration type corresponding to the registration request, and create, based on the registration type, a resource corresponding to the registration type.

15. One or more non-transitory computer-readable storage medium having stored thereon a computer program, when the computer program is executed by a processor, steps of the method for creating resources according to claim 1 are implemented.

* * * * *